United States Patent Office 2,766,218
Patented Oct. 9, 1956

2,766,218

METHOD FOR REACTING ACETONE-FORMALDE-HYDE CONDENSATE WITH ANILINE AND ACIDIC AGENT

Mortimer T. Harvey, South Orange, and Peter L. Rosamilia, Newark, N. J., assignors to Harvel Research Corporation, a corporation of New Jersey No Drawing. Application January 12, 1952, Serial No. 266,252

9 Claims. (Cl. 260—45.2)

This invention relates to novel compositions of matter and to methods for producing them and also to novel articles of manufacture produced therefrom. In one of its more specific aspects the invention is directed to novel compositions of matter produced with acetone-formaldehyde reaction products and aniline. A class of novel products of this invention are fusible thermosetting resins which may be comminuted and when in that condition will not mass or pack to form lumps in the course of normal storage under normal conditions. However, the resins of this invention may be in the liquid, semi-solid or solid state.

Whether in the liquid, semi-solid or solid state, the novel and unique resins of this invention are homogeneous resinous reaction products and are thermosetting. The liquid products particularly may be thinned with solvents, such as alcohol or acetone and said solutions spread on a base, the solvent evaporated and the resin cured on the base to provide tough film having extremely high resistance to acids, alkalies and solvents. The solid products, which are the liquid products heat converted to the solid, fusible thermosetting state may be comminuted to a fine powder. Such powders find utility as binders for abrasive particles in the manufacture of abrasive cutting wheels, grinding wheels and buffing wheels and as binders for asbestos in the manufacture of brake linings and clutch facings and also for molded and laminated articles of manufacture. When so used, they are first combined with the abrasive particles, asbestos, filler or sheets to be laminated and with or without the addition of formaldehyde, hexamethylene, tetramine, etc., for fast curing, and then subjected to heat whereupon the resin fuses and upon continued heating will be converted to the solid and substantially infusible state.

A class of starting materials in the preparation of the novel compositions of this invention are resinous organic reaction products of acetone and formaldehyde produced by reacting under alkaline conditions acetone and formaldehyde in the mole ratio of 1 mole of acetone to 2–6 moles and preferably 3–5 moles of formaldehyde. Said acetone-formaldehyde resinous organic reaction products are water soluble and thermosetting and are capable of being converted to the substantially solid and infusible state when maintained for 16 hours at 350° F., and sometimes contain limited amounts of free and/or loosely coupled formaldehyde.

Aniline and an acidic agent are also employed in the production of the novel compositions of this invention.

In the production of the reaction masses, which are, according to this invention, later to be reacted with formaldehyde to provide the unique resins of this invention, the sequence of reactant additions may vary. For example, the acetone-formaldehyde resinous reaction products may first be mixed with the acidic agent and subsequently the aniline is added thereto and the mass reacted. That is the preferable method. However, the acetone-formaldehyde resinous reaction products may be mixed with the aniline and then the acid may be added. Or, if desired, the acid may first be mixed with the aniline and then the acetone-formaldehyde resinous reaction products is added and in this case, the acid before addition should first be considerably diluted with water.

In general, the novel compositions of this invention may be produced by reacting a mixture of an acidic agent, aniline and said acetone-formaldehyde resinous organic reaction product. The ratio by weight of said acetone-formaldehyde resinous organic reaction product to aniline being in the range of 100 of the former to 50–300 parts of the latter. The acidic agent employed in said mixture may be any one of a number of either organic or inorganic acids, as well as certain salts such as phosphoric acid, hydrochloric acid, maleic and diglycollic acid, sodium acid phosphates, etc. There also may be employed combinations of these particular acidic agents such as phosphoric or hydrochloric in combination with small amounts of sulphuric acid or nitric acid. Taking phosphoric or hydrochloric acid as an example, the quantity of said acidic agent employed in general measures in weight approximately 10–40% of the quantity of said aniline. Instead of the phosphoric acid there may be employed the equivalent of said phosphoric acid, said equivalent being that amount of acidic agent which when added to a 100 gram sample mix of said acetone-formaldehyde resinous organic reaction products and aniline in the aforesaid proportions and the entire mix is heated to 250° F., and maintained at that temperature for 15 minutes, results in a substantially homogeneous and substantially clear mass.

After said mixture is reacted, the reaction mass is reacted with formaldehyde, with the mole amount of formaldehyde being .25–2 moles for each mole of aniline employed in the production of said reaction mass. The novel and unique resins so produced by this invention may be in the liquid, semi-solid or solid state and are intermediate thermosetting resins which may be heat cured on the acid, neutral or alkaline side. These novel resins when analyzed have been found to contain the anion of the acid employed in amounts roughly measuring about 3–15%, depending upon the acid used, of the weight of the resins.

The acetone-formaldehyde resinous organic reaction products may be produced in accordance with the general method hereinafter set forth in Example A which is given merely by way of illustration and not by way of limitation, all parts being given by weight unless otherwise specified.

EXAMPLE A 300 parts of acetone and 1700 parts of an aqueous solution of formaldehyde (37% concentration) are charged into a jacketed reaction vessel having a stirrer constantly in operation during this reaction process. Then one quarter of an aqueous solution consisting of 25 parts of caustic soda in 60 parts of water is slowly added to the mix. The batch is heated to about 125° F., and the steam in jacket turned off and jacket emptied. An exothermic reaction occurs and the temperature of the mass will gradually rise to about 200° F., and this is controlled by admitting cold water to the jacket immediately after the temperature of the mass begins to rise. Then after reaching about 200° F., the temperature of the mass begins to decrease and when it reaches about 180° F., the second quarter of the caustic soda solution is added to the mass and the temperature rises to 200° F. This procedure is repeated with the remaining two quarters of said caustic solution, keeping the cold water on the jacket at all times to keep the temperature of the reaction mass from going above about 200° F. After the last increment of caustic soda solution has been added and the temperature of the mass has gone up to 200° F., and then is allowed to decrease to 155° F., whereupon the mass is partially dehydrated under vacuum at about 150° F., by the use of steam in the jacket. The partial dehydration is continued and the mass strained into drums. The filtered mass hereafter known as product A is an aqueous solution of the acetone-formaldehyde resinous reaction mass (77% concentration) and has a viscosity of about 272 centipoises at 25° C., and a specific gravity of about 1.23.

A wide variety of acetone-formaldehyde resinous reaction products may be employed in the use of this invention. For example, the ratio of acetone to formaldehyde may be varied and in general is 1 mole of acetone to 2–6 and preferably 3–5 moles of formaldehyde, and in addition after the last exothermic reaction and before dehydration and/or after dehydration, said acetone-formaldehyde reaction products may be heated to thicken them, and said acetone-formaldehyde reaction products are such that an 80% aqueous solution thereof has a viscosity of approximately 200–10,000 centipoises at 25° C.

The following examples are given by way of illustration of the manner for producing unique resins of this invention, all parts being given by weight unless otherwise specified.

Example 1

Into a dough mixer, with cold water on the jacket, are consecutively charged, while the mixer is in operation, 40 pounds of aniline, 25 pounds of product A, and 40 pounds of water. After about 10 minutes of mixing, there is slowly added to the mix, while being constantly stirred, about 9 pounds and 9 ounces of concentrated hydrochloric acid. The mixing is continued for about 5 minutes after the last increment of acid has been added, and the temperature maintained by the cold water on the jacket below 50° C., and approximately 40–45° C. The resultant mass is a substantially homogeneous and clear solution. Then 37 pounds of an aqueous solution of formaldehyde (37% concentration) is divided into four equal portions which are separately added in about 5 minute intervals to the mass while under constant stirring, whereupon a resinous reaction product of the formaldehyde and the homogeneous solution precipitates. Stirring of the mass is continued for 1 hour, then is suction filtered and the solid resin is spread on paper to dry at room temperature. The resin is fusible and thermosetting and may be pulverized.

Example 2

Into a dough mixer, with cold water on the jacket, are consecutively charged, while the mixer is in operation, 20 pounds of aniline and 20 pounds of product A. After about 10 minutes of mixing, there is slowly added to the mix, while being constantly stirred, about 4 pounds and 13 ounces of concentrated hydrochloric acid. Mixing is continued for about 5 minutes after the last increment of acid has been added and the temperature maintained, by the cold water on the jacket, below 50° C. and approximately 40–45° C. The resultant mass is a substantially homogeneous and clear solution. Then 18 pounds and 8 ounces of an aqueous solution of formaldehyde (37% concentration) is divided into four equal parts which are separately added in 5 minute intervals to the mass while under constant stirring, whereupon a resinous reaction product of the formaldehyde and the homogeneous solution precipitates out. Stirring of the mass is continued for 1 hour, then is suction filtered and the solid resin is spread out on paper and air dried at room temperature, and if desired, pulverized.

Example 3

Into a 50 gallon kettle, there is placed 80 pounds of product A and 20 pounds of phosphoric acid. This mix is stirred continuously and heated to 250–350° F., and held at that temperature to a very heavy body, until a sample when cooled to room temperature is dry to the touch. At this temperature, or, if desired, allowed to cool to 200–300° F., there is slowly added thereto, while being constantly stirred, 64 pounds of aniline. A slight exothermic reaction takes place. Stirring is continued for 15–30 minutes whereupon the mass becomes a clear homogeneous solution. Then to this solution is slowly added 14 pounds of an aqueous solution of formaldehyde (37% concentration) and this mixture is also constantly stirred while maintained at 275–300° F., until a sample thereof when cooled to room temperature is a brittle button. Then the resinous mass is poured into pans, allowed to cool to room temperature overnight, and ground to powder.

The unique resins of this invention are eminently suitable in a wide variety of different fields. The solid fusible thermosetting resins of this invention, examples of which are illustrated in Examples 1–3 may be pulverized into fine powders which are free flowing and will not pack or lump under normal storage and transportation conditions; they may be converted to the liquid state at 250–300° F., and upon continued heating at that temperature may be converted to the substantially solid and infusible state. If a faster curing is desired, formaldehyde, hexamethylene tetramine may first be mixed with the powdered resin before the heat is applied.

We claim:

1. The method for producing a resin comprising reacting a mixture of an acidic agent, aniline and acetone-formaldehyde resinous reaction product produced by reacting acetone and formaldehyde under alkaline conditions, said resinous reaction product being water-soluble and capable of being converted to the substantially solid and infusible state when maintained at 350° F. for 16 hours, the ratio by weight of said resinous reaction product to said aniline being in the range of 100 parts of said resinous reaction product to 50–300 parts of aniline, said acidic agent being the equivalent to approximately 10–40% of phosphoric acid based upon the amount of aniline and which, when in a 100 gram sample mix of said resinous reaction product and aniline in the aforesaid proportions, is heated to 250° F., and maintained at that temperature for 15 minutes becomes a substantially homogeneous and clear solution, and then reacting said reaction mass with .25–2 moles of formaldehyde for each mole of aniline employed in the production of said reaction mass.

2. The method for producing a resin comprising reacting mixture comprised by weight of 100 parts of acetone-formaldehyde resinous reaction product produced by reacting acetone and formaldehyde under alkaline conditions, said resinous reaction product being water-soluble and capable of being converted to the substantially solid and infusible state when maintained at 350° F. for 16 hours, 50–300 parts of aniline and a quantity of phosphoric acid measuring approximately 10–40% of the quantity of said aniline employed, then reacting said reaction mass with formaldehyde, the amount of formaldehyde employed being .25–2 moles for each mole of aniline employed in the production of said reaction mass.

3. The method for producing a resin comprising reacting a mixture comprised by weight of 100 parts of acetone-formaldehyde resinous reaction product produced by reacting acetone and formaldehyde under alkaline conditions, said resinous reaction product being water-soluble and capable of being converted to the substantially solid and infusible state when maintained at 350° F. for 16 hours, 50–300 parts of aniline and a quantity of hydrochloric acid measuring approximately 10–40% of the quantity of said aniline employed, the amount of formaldehyde employed being .25–2 moles for each mole of aniline employed in the production of said reaction mass.

4. The method comprising heating at approximately 250–350° F., a mixture of an acidic agent and acetone-formaldehyde organic resinous reaction product produced by reacting acetone and formaldehyde under alkaline conditions, said resinous reaction product being water-soluble and capable of being converted to the substantially solid and infusible state when maintained at 350° F. for 16 hours, said heating continued until a sample thereof when cooled to room temperature is practically dry to the touch, then reacting said mass with aniline, the quantity of aniline employed being 50–300 parts by weight for each 100 parts by weight of said acetone-formaldehyde resinous reaction product employed, whereupon a substantially clear homogeneous solution results, and then reacting said substantially clear homogeneous solution with formaldehyde, the amount of formaldehyde employed being .25–2 moles of formaldehyde for each mole of aniline employed, said acidic agent being the equivalent to approximately 10–40% of phosphoric acid based upon the amount of aniline and which, when in a 100 gram mix of said resinous reaction product and aniline in the aforesaid proportions is heated to 250° F. and maintained at that temperature for 15 minutes becomes a substantially homogeneous and clear solution.

5. The method comprising heating at 250–350° F., a mixture of phosphoric acid and acetone-formaldehyde resinous reaction product which is water-soluble and capable of being converted to the substantially solid and infusible state when maintained at 350° F. for 16 hours, said mass maintained at said temperature to thicken and until a sample thereof when cooled to room temperature is practically dry to the touch, then reacting said thickened mass with aniline at elevated temperature to provide a substantially homogeneous and clear mass, the quantity of aniline employed being 50–300 parts by weight for each 100 parts acetone-formaldehyde resinous reaction product and the quantity of said phosphoric acid being approximately 10–40% of the quantity of said aniline, and then at elevated temperature reacting said reaction mass with formaldehyde, the amount of formaldehyde employed being .25–2 moles of formaldehyde for each mole of said aniline employed.

6. The method comprising heating at 250–350° F., a mixture of hydrochloric acid and acetone-formaldehyde resinous reaction product which is water-soluble and capable of being converted to the substantially solid and infusible state when maintained at 350° F. for 16 hours, said mass maintained at said temperature to thicken and until a sample thereof when cooled to room temperature is practically dry to the touch, then reacting said thickened mass with aniline at elevated temperature to provide a substantially homogeneous and clear mass, the quantity of aniline employed being 50–300 parts by weight for each 100 parts acetone-formaldehyde resinous reaction product and the quantity of said hydrochloric acid being approximately 10–40% of the quantity of said aniline, and then at elevated temperature reacting said reaction mass with formaldehyde, the amount of formaldehyde employed being .25–2 moles of formaldehyde for each mole of said aniline employed.

7. The method comprising reacting a mixture comprised by weight of 100 parts of acetone-formaldehyde resinous reaction product produced by reacting acetone and formaldehyde under alkaline conditions, said resinous reaction product being water-soluble and capable of being converted to the substantially solid and infusible state when maintained at 350° F. for 16 hours, 50–300 parts of aniline and a quantity of phosphoric acid measuring approximately 10–40% of the quantity of said aniline employed, said reaction continued until a substantially homogeneous and clear solution is obtained.

8. The method for producing a resin comprising reacting an acidic agent, aniline and acetone-formaldehyde resinous reaction product produced by reacting acetone and formaldehyde under alkaline conditions, said resinous reaction product being water-soluble and capable of being converted to the substantially solid and infusible state when maintained at 350° F. for 16 hours, the ratio by weight of said resinous reaction product to said aniline being in the range of 100 parts of said resinous reaction product to 50–300 parts of aniline, said acidic agent being the equivalent to approximately 10–40% of phosphoric acid based upon the amount of aniline and which, when in a 100 gram mix of said resinous reaction product and aniline in the aforesaid proportions is heated to 250° F., and maintained at that temperature for 15 minutes becomes a substantially homogeneous and clear solution, said first mentioned reaction continued until a substantially homogeneous and clear solution is obtained and then reacting said substantially homogeneous and clear solution with .25–2 moles of formaldehyde for each mole of aniline employed in the production of said reaction mass.

9. The method for producing a resin comprising reacting an acidic agent, aniline and acetone-formaldehyde resinous reaction product produced by reacting acetone and formaldehyde under alkaline conditions, said resinous reaction product being water-soluble and capable of being converted to the substantially solid and infusible state when maintained at 350° F. for 16 hours, the ratio by weight of said resinous reaction product to said aniline being in the range of 100 parts of said resinous reaction product to 50–300 parts of aniline, said acidic agent being the equivalent to approximately 10–40% of phosphoric acid based upon the amount of aniline and which, when in a 100 gram sample mix of said resinous reaction product and aniline in the aforesaid proportions is heated to 250° F., and maintained at that temperature for 15 minutes becomes a substantially homogeneous and clear solution, said reacting being continued until a substantially clear homogeneous solution is produced.

References Cited in the file of this patent

UNITED STATES PATENTS 2,191,802   Novotny et al. _____ Feb. 27, 1940